US007328288B2

(12) United States Patent
Tateno

(10) Patent No.: US 7,328,288 B2
(45) Date of Patent: Feb. 5, 2008

(54) RELAY APPARATUS FOR RELAYING COMMUNICATION FROM CPU TO PERIPHERAL DEVICE

(75) Inventor: Tetsuya Tateno, Hadano (JP)

(73) Assignee: Canon Kabushiki Kaisha, Tokyo (JP)

( * ) Notice: Subject to any disclaimer, the term of this patent is extended or adjusted under 35 U.S.C. 154(b) by 424 days.

(21) Appl. No.: 11/003,294

(22) Filed: Dec. 3, 2004

(65) Prior Publication Data

US 2005/0132098 A1 Jun. 16, 2005

(30) Foreign Application Priority Data

Dec. 11, 2003 (JP) ............................. 2003-413468
Dec. 11, 2003 (JP) ............................. 2003-413469

(51) Int. Cl.
*G06F 13/00* (2006.01)
*G06F 3/00* (2006.01)

(52) U.S. Cl. ............................. 710/35; 710/8; 710/72; 710/305

(58) Field of Classification Search ............. 710/8–12, 710/22–35, 72, 305–313
See application file for complete search history.

(56) References Cited

U.S. PATENT DOCUMENTS

| 5,680,643 | A | * | 10/1997 | Flynn ........................... 710/35 |
| 5,784,707 | A | | 7/1998 | Khalidi et al. |
| 6,011,921 | A | | 1/2000 | Takahashi et al. |
| 6,134,631 | A | * | 10/2000 | Jennings, III ................ 711/117 |
| 6,393,500 | B1 | * | 5/2002 | Thekkath ..................... 710/35 |
| 6,640,266 | B2 | * | 10/2003 | Arcoleo et al. ................ 710/35 |
| 6,857,308 | B2 | * | 2/2005 | Johnson et al. ................ 73/40 |
| 2003/0036860 | A1 | * | 2/2003 | Rice et al. ..................... 702/57 |
| 2003/0084231 | A1 | | 5/2003 | Yoshimura |
| 2003/0131161 | A1 | * | 7/2003 | Dodd et al. .................... 710/35 |
| 2004/0010637 | A1 | * | 1/2004 | Johnson ....................... 710/35 |
| 2006/0005160 | A1 | * | 1/2006 | Schultz et al. .............. 717/105 |

FOREIGN PATENT DOCUMENTS

| JP | 08-036528 A | 2/1996 |
| JP | 11-250672 A | 9/1999 |
| JP | 2000-137674 A | 5/2000 |
| JP | 2003-141888 A | 5/2003 |

* cited by examiner

*Primary Examiner*—Christopher Shin
(74) *Attorney, Agent, or Firm*—Canon U.S.A., Inc. I.P. Division

(57) ABSTRACT

In order to reduce overhead of a CPU, a relay apparatus for relaying communication from a CPU to a peripheral device includes communication information holding sections for holding information required for communication with the peripheral devices inside the relay apparatus; and command holding sections, which are provided adjacent to the communication information holding section, for holding commands used to communicate desired information inside the communication information holding section to the peripheral device. The CPU writes desired information in the communication information holding section and the command holding section inside the relay apparatus by burst-mode communication, and the relay apparatus performs communication with the peripheral devices in accordance with instructions from the command holding section after the writing of the desired information in the communication holding section and the command holding section is completed.

5 Claims, 5 Drawing Sheets

RELAY APPARATUS FOR RELAYING COMMUNICATION FROM CPU TO PERIPHERAL DEVICE

BACKGROUND OF THE INVENTION

1. Field of the Invention

The present invention relates to a peripheral circuit that operates in accordance with instructions from a CPU. More particularly, the present invention relates to the implementation of a register for writing commands inside an apparatus for performing a desired operation by receiving an instruction from a CPU.

2. Description of the Related Art

In electronic systems such as digital cameras, there have been increasing demands for more complex processing. When such complex processing is to be performed by a single CPU, the load on the CPU increases, and the performance of the entire system thus decreases. However, if a large number of CPUs are installed to distribute the processing, the cost increases. For this reason, it is common practice that the electronic system is formed of a CPU and peripheral devices that perform complex operations in accordance with simple commands from the CPU. In such an electronic system, the CPU gives instructions to peripheral devices, etc., so that a series of sequences is performed.

For example, in the driving of an optical sensor of a digital camera, the CPU detects that the release button of the camera main unit is half pressed, instructs the shape of a driving waveform to a timing pulse generation device for generating a driving pulse of the optical sensor, instructs a read-out area to the optical sensor, instructs the specification of an amplification ratio and the calibration operation of an offset level to an A/D converter for converting an optical sensor output to digital values, and instructs a reference voltage to a D/A converter for generating a reference voltage. Thereafter, it is necessary to detect that the release button is fully pressed and to notify many commands, such as instructions for starting the operation of the optical sensor and the A/D converter, to the peripheral device and the sensor.

In the electronic system requiring real-time processing, such as a digital camera, the CPU needs to perform these communications at an appropriate timing, and there are many cases in which the communication speed of the peripheral device is not so high. For this reason, when an operation is performed with a communication rate matching a peripheral device, communication from the CPU to the peripheral device becomes an overhead of the system, and a side effect, such as a time lag in the shutter operation, appears. In order to deal with such a side effect, many electronic systems adopt a configuration in which the CPU performs communication only with a specific peripheral device having a high communication speed and this peripheral device performs communication with the other peripheral device having a low communication speed in place of the CPU, so that the overhead of the CPU, which is involved with communication, is reduced. For communication between the CPU and the specific peripheral device having a high communication speed, it is common practice that, for example, a burst mode is used in which, for first data, the corresponding address is transmitted, and thereafter, only the data is transmitted by assuming that the address is automatically incremented for each piece of data, so that speed increases.

FIG. 5 shows a specific example of the configuration of an imaging section of a digital camera. A CPU 501 controls an image capturing sequence. A peripheral device 502 takes over the communication of the CPU 501. A timing pulse generation device 503 controls the operation timing of the optical sensor and an A/D (analog-to-digital) converter 506. A D/A (digital-to-analog) converter 504 provides a reference voltage to an optical sensor 505. The CPU 501 and the peripheral device 502 communicate via a high-speed communication line 507 connected therebetween. A comparatively low-speed communication line 508 is used for communication among the peripheral device 502, the timing pulse generation device 503, the D/A converter 504, the optical sensor 505, and the A/D converter 506. Output from the optical sensor is transmitted to the A/D converter 506 via an optical-response analog output line 509. An optical output from the A/D converter is digitized via an output line 510. The reference voltage of the D/A converter 504 is output via an output line 511. Timing pulse output lines 512 and 513 are provided from the timing pulse generation device to the optical sensor 505 and the A/D converter 506, respectively.

The CPU 501, through the comparatively high-speed communication line 507, writes a desired value in a plurality of registers for storing parameters for controlling the operation of the timing pulse generation device 503 incorporated in the peripheral device 502, and writes a command for communicating the values stored in the plurality of registers to the timing pulse generation device 503 into the command register of the peripheral device 502. As a result, in place of the CPU 501, the peripheral device 502 performs the setting of necessary parameters in the timing pulse generation device 503 through the comparatively low-speed communication line 508.

Similarly, by also writing into the internal register of the peripheral device 502 for the purpose of setting the D/A converter 504, the optical sensor 505, and the A/D converter 506, the peripheral device 502, in place of the CPU, performs communication with the D/A converter 504, the optical sensor 505, and the A/D converter 506 through the comparatively low-speed communication line 508.

FIG. 7 shows the configuration of a register incorporated in the peripheral device 502 for performing communication in place of the CPU in a conventional electronic system. Each rectangle indicates a one-word register. Register groups 702, 703, and 704 shown in FIG. 7 are used for holding parameters to be written into the timing pulse generation device 503, the D/A converter 504, and the optical sensor 505 of FIG. 5. For the sake of simplicity in the figures, here, the register group for holding parameters to be written into the A/D converter 506 is not shown. A command register 701 is used for writing commands. As described above, in order to perform communication with the timing pulse generation device 503, the CPU 501 sets parameters in the register group indicated by 702, and then writes a command for performing communication with the timing pulse generation device 503 in the command register indicated by 701.

FIG. 6 shows a conventional example of a waveform when this communication is performed by serial communication in the burst mode. CS denotes a chip select signal in serial communication. SCLK denotes a communication clock in serial communication. SD denotes data in serial communication.

The low state of the chip select signal CS indicates the effective period of the communication data. An operation of writing data SD into the register of FIG. 7 is performed in synchronization with the rise of the communication clock SCLK of the low period. The period indicated by 601 in FIG. 6 is a flag indicating the read and write direction of the serial communication. The period indicated by 602 is an address at which data is to be written. The period indicated by 603 is data to be written at the address 602. Since this communication is burst-mode communication, reference numeral 604 denotes data to be written at the next address. Reference numeral 605 denotes the last written data of burst-mode communication. A flag indicating the read and write direction of a second serial communication is indicated by 607. A command to be written into the command register is indicated by 606.

In the manner described above, as a result of writing parameters in the burst-mode serial communication and writing commands in the normal-mode serial communication thereafter, it becomes possible for the peripheral device 502 of FIG. 5 to communicate with the timing pulse generation device 503, the D/A conversion device 504, the optical sensor 505, and the A/D converter 506, which are the other peripheral devices.

As another related technology, Japanese Patent Laid-Open No. 9-261278 is also known.

However, in the conventional method, it is necessary to separately perform serial communication in the burst mode for setting parameters and serial communication for writing commands. For this reason, firmware for performing serial communication with the peripheral device 502 becomes complex in the CPU, and also, the communication takes time, and an overhead occurs.

SUMMARY OF THE INVENTION

The present invention enables a specific peripheral device to perform communication with another peripheral device by one burst-mode communication with peripheral devices in order to reduce the CPU overhead.

In one aspect, the present invention provides a relay apparatus for relaying communication from a CPU to peripheral devices, the relay apparatus including: a communication information holding section configured to hold information required for communication with the peripheral devices inside the relay apparatus; and a command holding section, which is provided adjacent to the communication information holding section, configured to hold commands used to communicate desired information inside the communication information holding section to the peripheral devices. The CPU writes desired information in the communication information holding section and the command holding section inside the relay apparatus by burst-mode communication, and the relay apparatus performs communication with the peripheral devices in accordance with instructions from the command holding section after the writing of desired information in the communication information holding section and the command holding section is completed.

In another aspect, the present invention provides a timing pulse generation device for an optical sensor, the timing pulse generation device having a relay function for relaying communication from a CPU to peripheral devices, the timing pulse generation device including: a communication information holding section configured to hold information required for communication to the peripheral devices; and a command holding section, which is provided adjacent the communication information holding section, for holding commands for communicating desired information inside the communication information holding section to the peripheral devices. The CPU writes desired information into the communication information holding section and the command holding section inside the timing pulse generation device by burst-mode communication, and the timing pulse generation device performs communication with the peripheral devices in accordance with instructions from the command holding section after the writing of the desired information into the communication information holding section and the command holding section is completed.

With the above-described configuration, a system is made possible in which setting of parameters and writing of commands are possible by one burst-mode communication. This reduces overhead associated with the communication of the CPU by reducing the communication time and by reducing the complexity of the firmware, and the time involved with the processing such as system start-up, setting changes, etc.

Further features and advantages of the present invention will become apparent from the following description of exemplary embodiments with reference to the attached drawings.

DESCRIPTION OF THE EMBODIMENTS

Exemplary embodiments of the present invention will be described below in detail with reference to the drawings.

Figure 1:
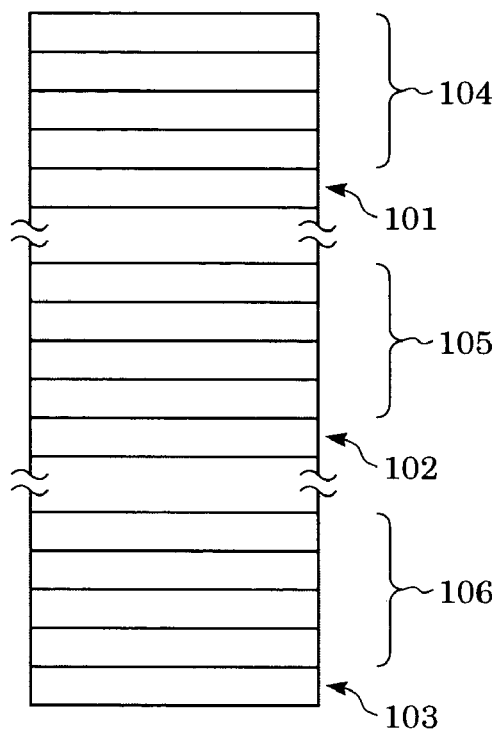
FIG. 1 shows a method of arranging command registers according to an embodiment of the present invention.

FIG. 1 shows an embodiment of the present invention, and also shows the configuration of internal registers of a peripheral device (relay apparatus) for taking over communication from a CPU to another peripheral device.

Figure 5:
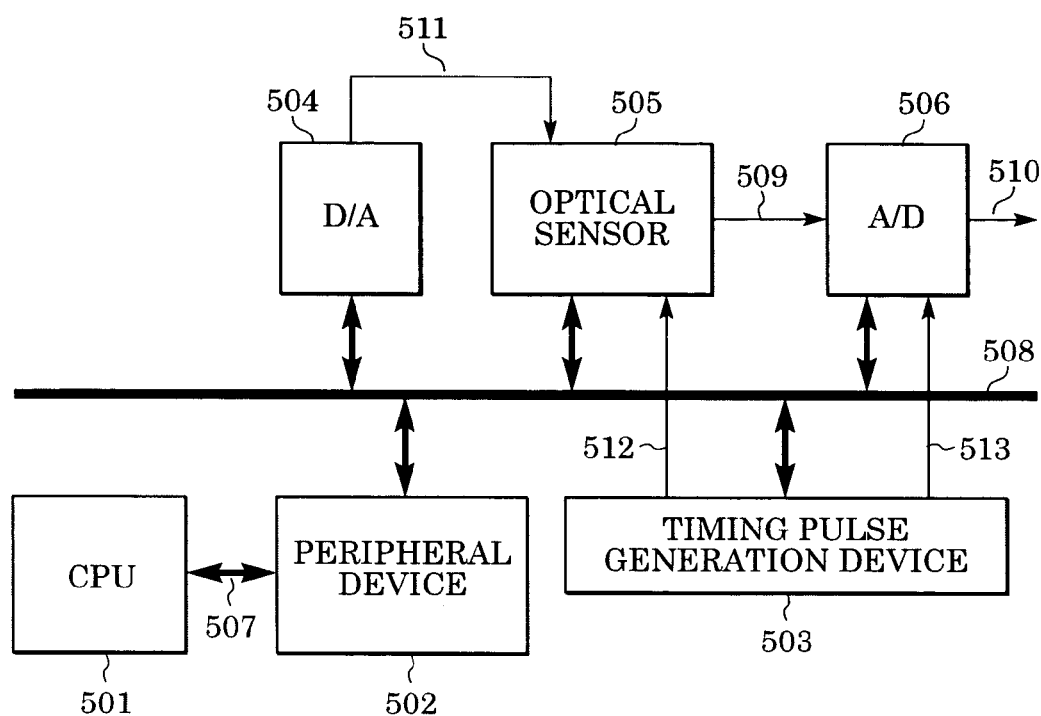
FIG. 5 shows an example of the configuration of a system for the purpose of illustrating the present invention and a conventional example.
Figure 6:
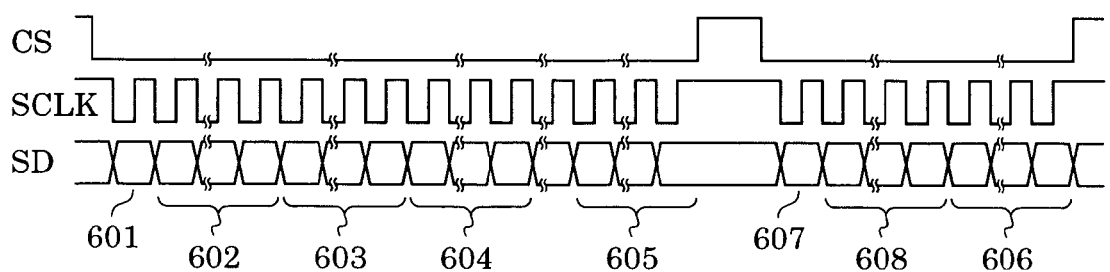
FIG. 6 is a timing chart illustrating a conventional example.
Figure 7:
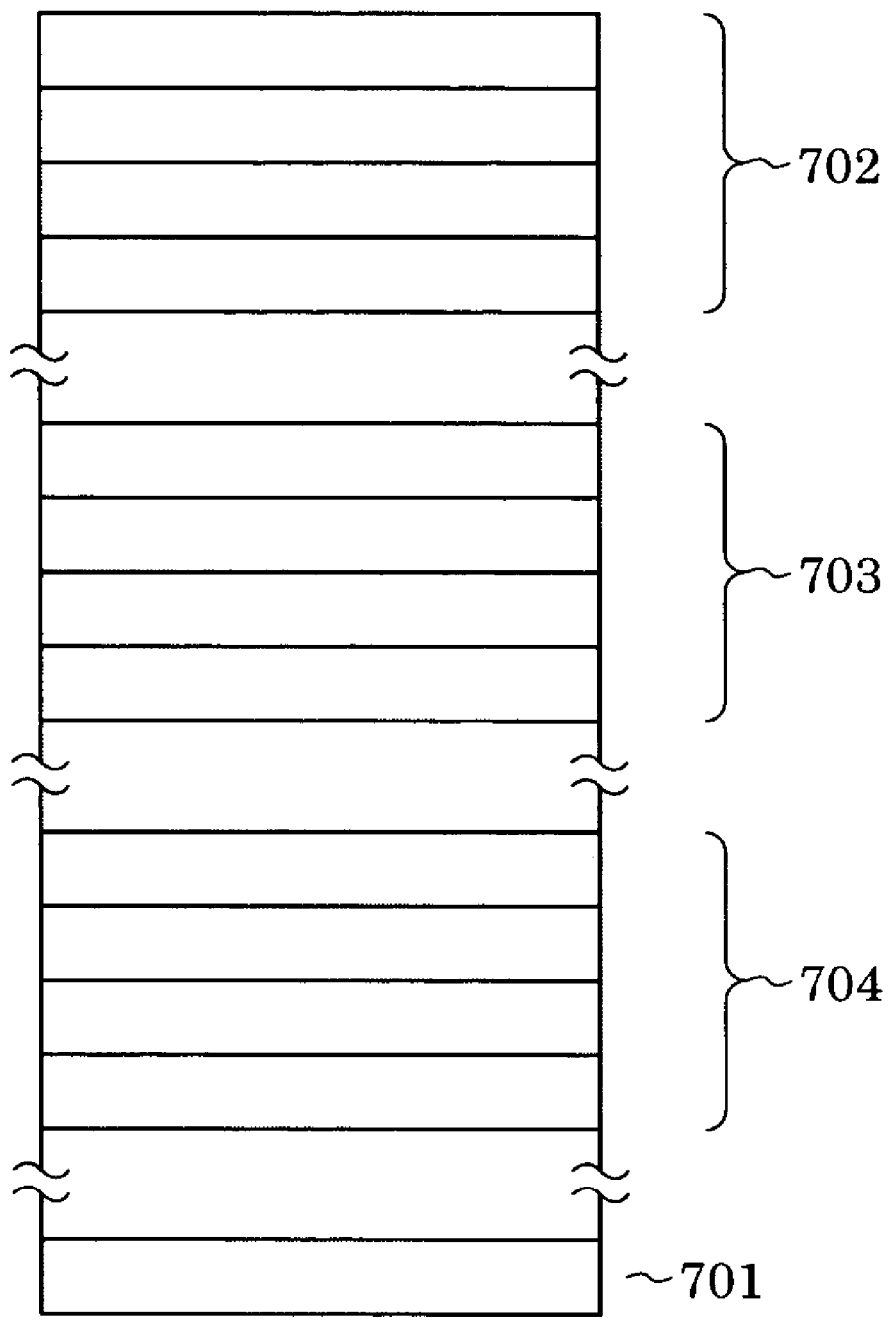
FIG. 7 shows a method of arranging a command register according to the conventional example.

Referring to FIG. 1, a first register group 104 holds parameters of the peripheral device requiring communication from the CPU. A first command register 101 holds a command for instructing the execution of communication. A second register group 105 holds parameters of a second peripheral device. A second command register 102 holds a command for instructing the execution of communication. A third register group 106 holds parameters of a third peripheral device requiring communication from the CPU. A third command register 103 holds a command for instructing the execution of communication. A description is given with reference to the configuration of FIG. 5. For example, the first peripheral device is a timing pulse generation device 503, the second peripheral device is a D/A converter 504, and the third peripheral device is an optical sensor 505.

As shown in FIG. 1, the construction is formed in such a way that the command registers are arranged adjacent to the end of the final address of the respective parameter register groups with respect to the register group for holding parameters for individual peripheral devices.

Figure 2:
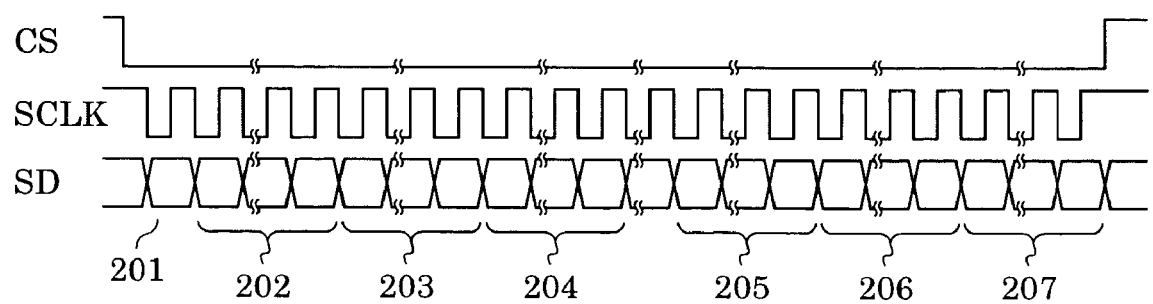
FIG. 2 is a timing chart illustrating the embodiment of the present invention.

FIG. 2 shows a waveform when this communication is performed by serial communication of a burst mode. CS denotes a chip select signal of the serial communication. SCLK denotes a communication clock of the serial communication. SD denotes data of the serial communication.

The low state of the chip select signal CS indicates the effective period of the communication data, and an operation of writing the data SD into the register of FIG. 1 is performed in synchronization with the rise of the communication clock SCLK of the low period. The period indicated by 201 in FIG. 2 indicates a flag representing the read and write direction of the serial communication. The period indicated by 202 is an address at which data is to be written. The period indicated by 203 indicates data to be written into the address 202, and this can be considered as data to be written into the first register of the register group 104 in FIG. 1. Since this communication is a communication in the burst mode, reference numeral 204 indicates data to be written into the next address 202. During the burst-mode communication period after that, since the address of the register at which data is written is incremented by one in response to the writing of the data, only the data may be sent as communication information. Reference numeral 207 denotes the last written data of the burst-mode communication and also a command to be written into the command register. This data can be considered as data to be written into the register 101 in FIG. 1.

Similarly, the period 203 can also be considered as data to be written into the first register of the register group 105 or 106 in FIG. 1. Reference numeral 207 can also be considered as data to be written into the command registers 102 and 103.

In the manner described above, as a result of arranging the parameter register and the command register so as to be adjacent to each other, one burst communication enables data to be written into the parameter register and the command register.

Up to this point, a description has been given by using as an example a peripheral device for taking over the communication by the CPU with the peripheral device and the other peripheral devices. However, it is also possible to design a more compact system by incorporating a function for taking over communication in a timing pulse generation device, etc.

Figure 3:
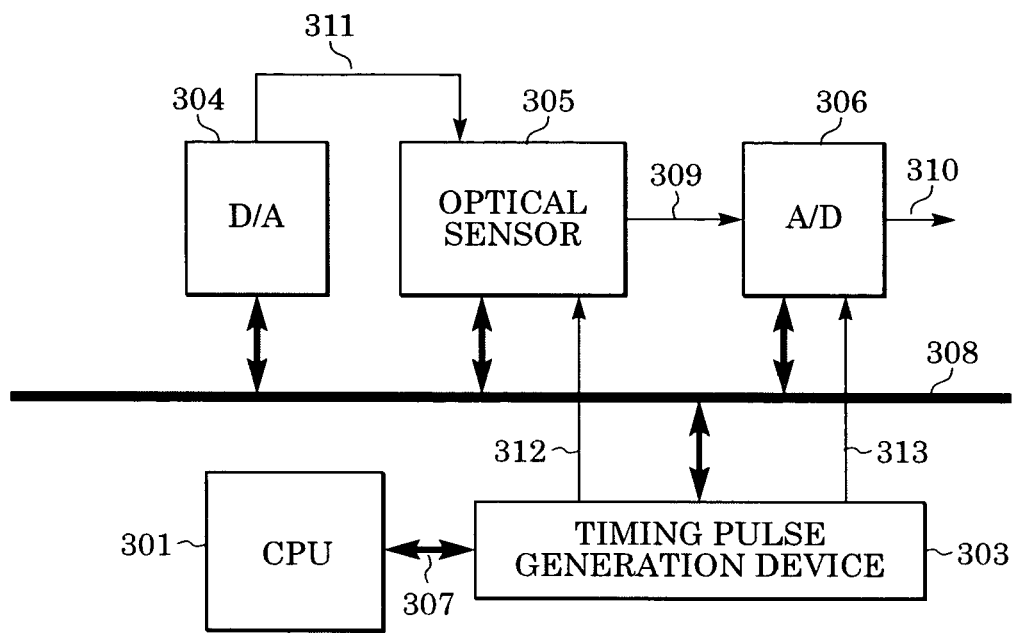
FIG. 3 shows an example of the configuration of a system to which the embodiment of the present invention is applied.

FIG. 3 shows the configuration of an imaging system of a digital camera when the function of a peripheral device for taking over the CPU is incorporated inside a timing pulse generation device 303 according to the embodiment of the present invention.

In FIG. 3, a CPU 301 controls the imaging system. A D/A converter 304 supplies a reference voltage to an optical sensor 305. An A/D converter 306 converts an analog signal into a digital value. A high-speed communication line 307 is provided between the CPU 301 and a timing pulse generation device 303. A comparatively low-speed communication line 308 is used for communication among the timing pulse generation device 303, the D/A converter 304, the optical sensor 305, and the A/D converter 306. An optical-response analog output line 309 is provided for output from the optical sensor 305 to the A/D converter 306. An output line 310 is provided in which an optical output from the A/D converter 306 is digitized. An output line 311 is provided for outputting the reference voltage of the D/A converter 304. Timing pulse output lines 312 and 313 are provided from the timing pulse generation device 303 to the optical sensor 305 and the A/D converter 306, respectively. In this manner, as a result of incorporating the function for taking over the communication from the CPU to the peripheral device in the timing pulse generation device 303, a compact system in which the number of parts of the imaging system is reduced can be realized.

Up to this point, an example in which a plurality of command registers are provided has been described with reference to the embodiment of FIG. 1. For the command register, by nature, since the written content becomes unnecessary if the command is executed after the execution command is written, there is no need to provide a plurality of the command registers. In order to obtain the advantages of the present invention, only a plurality of virtual addresses needs to be provided, so that the addresses are converted into an actual addresses indicating one register.

Figure 4:
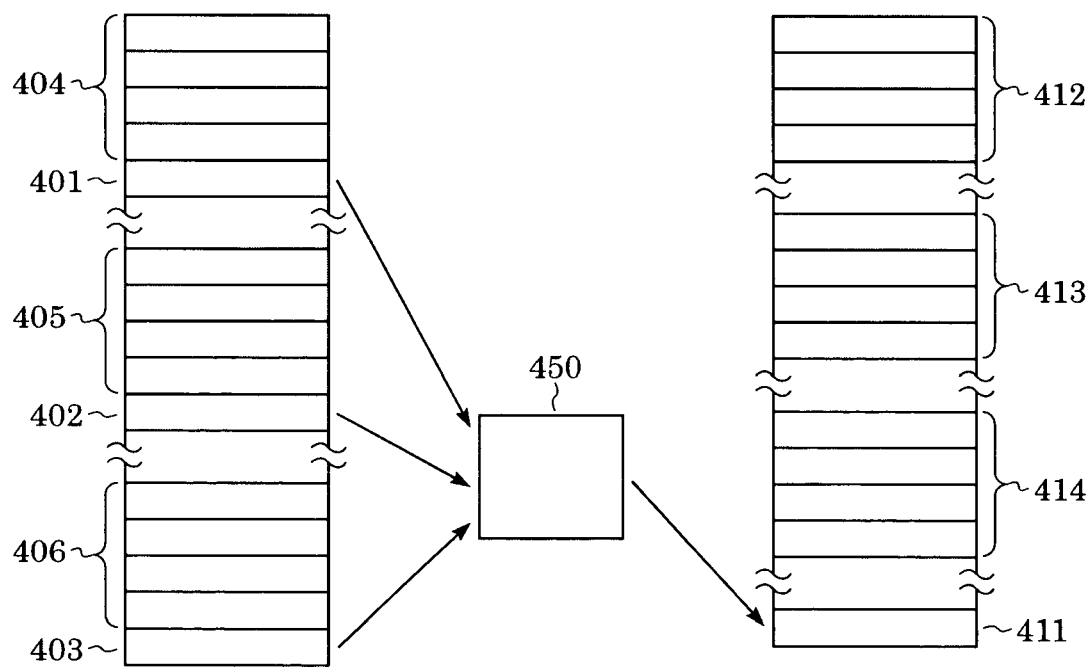
FIG. 4 shows another embodiment of the method of arranging command registers according to the present invention.

FIG. 4 shows the construction in which the virtual addresses of the plurality of command registers are converted into the actual addresses of one command register.

FIG. 4 illustrates virtual addresses of registers 401 to 406 which are converted via a converting unit 450 into actual addresses 411 to 414.

The virtual addresses 401, 402, and 403 are command registers arranged adjacent to the final address of the register group 404, the register group 405, and the register group 406, respectively. A register group of the actual address 412 corresponds to the virtual address of the register group 404. A register group of the actual address 413 corresponds to the virtual address of the register group 405. A register group of the actual address 414 corresponds to the virtual address of the register group 406. The command registers 401, 402, and 403 of the plurality of virtual addresses are address-converted into the command register 411 of one actual address by the conversion unit 450. As a result of being configured as shown in FIG. 4, a construction in which an overhead due to an increase in the number of command registers does not occur can be realized.

Next, a description is given of a specific configuration of a digital camera including the timing pulse generation device of the above-described embodiment. The timing pulse generation device of FIG. 8 can be replaced with the peripheral device and the timing pulse generation device shown in FIG. 5.

In the above description, the burst mode refers to a mode in which a plurality of pieces of data are transferred by one address specification in data transfer.

Figure 8:
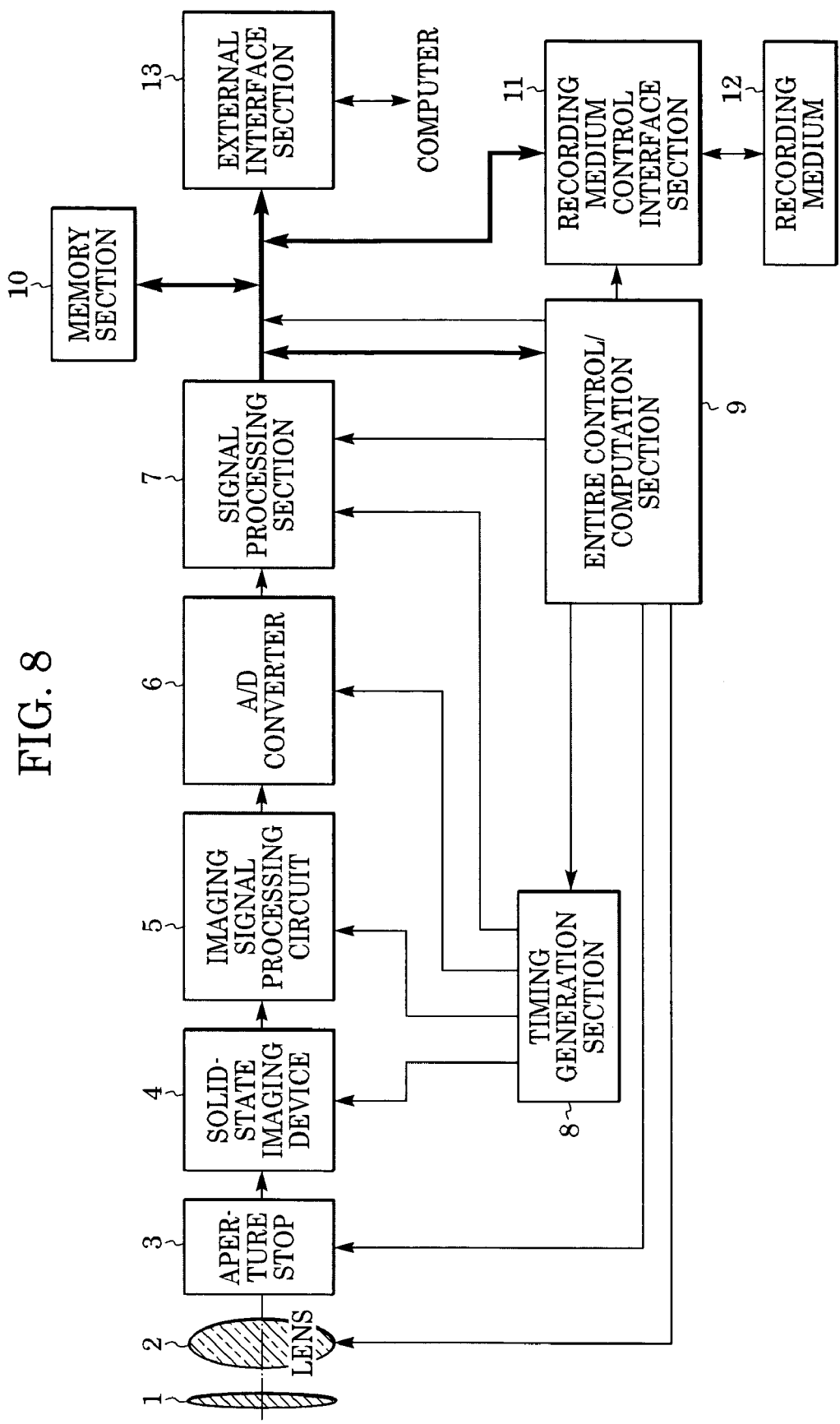
FIG. 8 is a block diagram showing a specific configuration of a digital camera serving as an imaging system of the present invention.

FIG. 8 is a block diagram of a digital camera serving as an imaging system according to the present invention.

In FIG. 8, a barrier 1 serves as both a lens protect and a main switch. A lens 2 allows a solid-state imaging device 4 to form an optical image of a subject into an image. An aperture stop 3 varies the amount of light passing through the lens 2. The solid-state imaging device 4 receives a subject which is formed into an image as an image signal by the lens 2. An A/D converter 6 performs analog-to-digital conversion on the image signal output from the solid-state imaging device 4. An image processing section (signal processing section) performs various corrections on the image data output from the A/D converter 6 and compresses the data. A timing generation section 8 outputs various timing signals to the solid-state imaging device 4, an imaging signal processing circuit 5, the A/D converter 6, and the image processing section 7. An entire control/computation section 9 is formed of a CPU for controlling various computations and the entire still video camera. A memory section 10 temporarily stores image data. An interface section 11 performs recording on or reading from a recording medium. A removable recording medium, such as a semiconductor memory 12, is provided for recording and reading image data. An interface section 13 is provided for communicating with, for example, an external computer.

Next, a description is given of the operation of the digital camera during photo-taking in the above-described configuration.

When the barrier 1 is opened, the main power-supply is switched on. Then, the power-supply of the control system is switched on, and the power-supply of the imaging system circuit, such as the A/D converter 6, is switched on.

Then, in order to control the amount of exposure, the entire control/computation section 9 causes the aperture stop 3 to be opened, and the signal output from the solid-state imaging device 4 is converted by the A/D converter 6. Thereafter, the signal is input to the image processing section 7. Based on the data, the computation of the exposure is performed by the entire control/computation section 9.

The brightness is determined based on the result of the photometering, and the entire control/computation section 9 controls the aperture stop 3 in accordance with the result.

Next, based on the signal output from the solid-state imaging device 4, high-frequency components are extracted, and the entire control/computation section 9 performs the computation of the distance to the subject. Thereafter, the lens is driven to determine whether or not a focus is achieved. When it is determined that a focus is not achieved, the lens is driven again and photometering is performed.

Then, after a focus is confirmed, the exposure is started. When the exposure is completed, the image signal output from the solid-state imaging device 4 is converted from analog to digital by the A/D converter, is passed through the image processing section 7, and is written into the memory section 10 by the entire control/execution section 9. Thereafter, the data stored in the memory section 10 is passed through the recording medium control interface section under the control of the entire control/computation section 9, and is recorded in a removable recording medium 12, such as a semiconductor memory. Alternatively, the image may be processed by passing data through the external interface section 13 and directly inputting it to a computer.

The present invention can be used for an apparatus including a CPU, peripheral device that operate in accordance with a command from the CPU, and a relay apparatus for relaying between them. For example, the present invention can be used for an imaging system, such as a digital camera and a video camera.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application Nos. 2003-413468 and 2003-413469 filed Dec. 11, 2003, which are hereby incorporated by reference herein.

What is claimed is:

1. A timing pulse generation device for an optical sensor, the timing pulse generation device having a relay function for relaying communication from a CPU to a peripheral device, the timing pulse generation device comprising:
   a communication information holding section configured to hold information required for communication to the peripheral device; and
   a command holding section, which is provided adjacent to the communication information holding section, configured to hold commands for communicating desired information inside the communication information holding section to the peripheral device,
   wherein the CPU writes desired information into the communication information holding section and the command holding section inside the timing pulse generation device by burst-mode communication, and the timing pulse generation device performs communication with the peripheral device in accordance with instructions from the command holding section after the desired information has been written into the communication information holding section and the command holding section.

2. The timing pulse generation device according to claim 1, wherein the timing pulse generation device comprises a plurality of the communication information holding sections.

3. The timing pulse generation device according to claim 2, wherein the timing pulse generation device comprises a plurality of the command holding sections.

4. The timing pulse generation device according to claim 1, wherein the command holding section can be specified from a plurality of addresses.

5. An imaging system comprising:
   a timing pulse generation device according to claim 1; the CPU;
   an optical sensor;
   a signal processing circuit configured to process signals output from the optical sensor; and
   an optical system for forming light into an image onto the optical sensor.

* * * * *